(12) United States Patent
Watanabe

(10) Patent No.: US 6,700,710 B2
(45) Date of Patent: Mar. 2, 2004

(54) LIQUID IMMERSION TYPE MICROSCOPE OBJECTIVE LENS

(75) Inventor: Katsuya Watanabe, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/270,058

(22) Filed: Oct. 15, 2002

(65) Prior Publication Data

US 2003/0076600 A1 Apr. 24, 2003

(30) Foreign Application Priority Data

Oct. 17, 2001 (JP) ........................ 2001-319653

(51) Int. Cl.$^7$ ................................ G02B 21/02
(52) U.S. Cl. ...................... 359/661; 359/656
(58) Field of Search ................. 359/656–661, 359/754–756

(56) References Cited

U.S. PATENT DOCUMENTS 4,540,248 A * 9/1985 Togino ................. 359/658

FOREIGN PATENT DOCUMENTS

| JP | 6-281864 | 10/1994 |
| JP | 8-292374 | 11/1996 |
| JP | 9-258107 | 10/1997 |

* cited by examiner

Primary Examiner—Georgia Epps
Assistant Examiner—William Choi
(74) Attorney, Agent, or Firm—Miles & Stockbridge, P.C.

(57) ABSTRACT

A liquid immersion type microscope objective lens includes, in sequence from an object side, a first lens group containing meniscus lenses with their concave surfaces toward an object and having positive refractive power, a second lens group having the positive refractive power, and a third lens group having negative refractive power, wherein a distance from an object surface to a first lens surface of said first lens group is larger than a focal length f of a whole objective lens system, and a radius of curvature $r_1$ of the first lens surface in relation to the focal length f satisfies a relation such as $4<|r_1/f|<7$.

5 Claims, 6 Drawing Sheets

S1  S2 S3 S4 S5 S6

LIQUID IMMERSION TYPE MICROSCOPE OBJECTIVE LENS

This application claims the benefit of Japanese Patent application No. 2001-319653 which is hereby incorporated by reference.

BACKGROUND OF THE INVENTION

1. Field of the Invention

The present invention relates generally to a liquid immersion type microscope objective lens, and more particularly to a liquid immersion type microscope objective lens suited to the use for, e.g., the patch clamp.

2. Related Background Art

In the biological field, a microscope is used often for the patch clamp as well as for morphological observations as conventionally performed.

The patch clamp is defined as a method for quantitatively measuring a change in membrane potential generated by action of an ion channel of a cell membrane.

A measurer puts a living cell into a culture liquid (medium) in a laboratory dish and brings a hyperfine electrode (glass electrode) into contact with a desired point of the cell in a way that observes it with a microscope.

Accordingly, the microscope objective lens for the patch clamp is classified as a liquid immersion type (the liquid immersion type microscope objective lens) of which a front end is contactable with the culture liquid, and is structured so that a gap (operation distance) between its front end and an object surface is taken sufficiently long enough to receive an insertion of the glass electrode.

Incidentally, the operation distance of the conventional liquid immersion type microscope objective lens for the path clamp is 2–3 mm (as exemplified in, for example, Japanese patent application Laid-Open No. 8-29237).

By the way, a magnification of the liquid immersion type microscope objective lens for the path clamp is approximately 60 at the maximum due to a restraint of the operation distance from being increased.

In recent years, however, a measurement target becomes hyperfine with an advancement of research, and hence there arise demands for increasing the magnification (up to, e.g., 100) of the liquid immersion type microscope objective lens for the path clamp and for increasing a numerical aperture.

SUMMARY OF THE INVENTION

Under such circumstances, it is an object of the present invention to provide a liquid immersion type microscope objective lens capable of increasing the magnification and the numerical aperture in a way that keeps a sufficient operation distance.

To accomplish the above object, according to one aspect of the present invention, a liquid immersion type microscope objective lens includes, in sequence from an object side, a first lens group containing a meniscus lens with the concave surfaces toward an object and having positive refractive power, a second lens group having positive refractive power, and a third lens group having negative refractive power, wherein a distance from an object surface to a first lens surface of the first lens group is larger than a focal length f of a whole objective lens system, and a radius of curvature $r_1$ of the first lens surface in relation to the focal length f satisfies a relation such as $4<|r_1/f|<7$.

In the liquid immersion type microscope objective lens of the present invention, the first lens group is preferably constructed of a cemented meniscus lens and two or more single lenses.

In the liquid immersion type microscope objective lens of the present invention, it is desirable that a refractive index $n_3$ of the single lens, closest to the object, of the single lenses satisfies a relation such as $n_3>1.65$.

In the liquid immersion type microscope objective lens of the present invention, it is preferable that a radius of curvature $r_2$ of a cemented surface of the meniscus lens and the radius of curvature $r_1$ of the first lens surface satisfy a relation such as $0.6<|r_2/r_1|<0.9$.

DESCRIPTION OF THE PREFERRED EMBODIMENT

An embodiment of the present invention will hereinafter be described with reference to the accompanying drawings.

Figure 1:
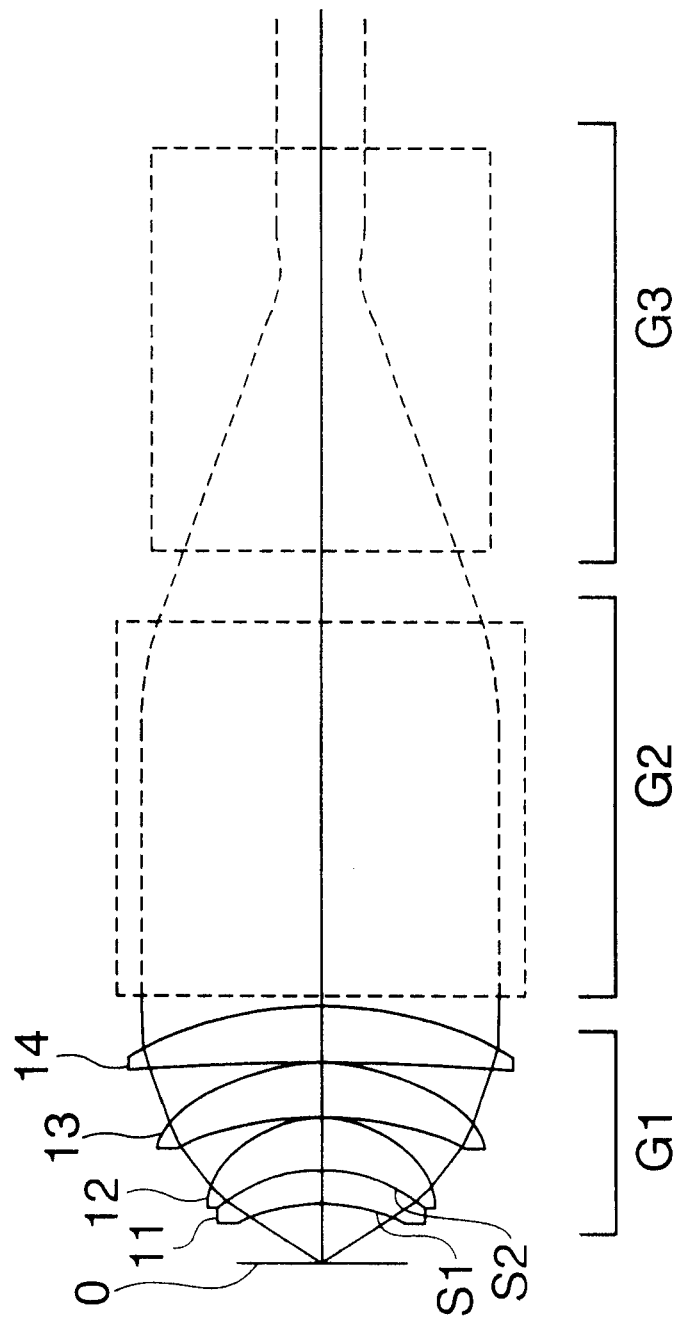
FIG. 1 is a view showing a basic configuration of a liquid immersion type microscope objective lens in an embodiment of the present invention.

FIG. 1 is a view showing a basic configuration of a liquid immersion type microscope objective lens in this embodiment.

The liquid immersion type microscope objective lens includes, in sequence from an object side, a first lens group G1 containing meniscus lenses (a first lens 11 and a second lens 12) with their concave surfaces toward the object and having positive refractive power, a second lens group G2 having the positive refractive power, and a third lens group having negative refractive power.

The second lens group G2 contains a plurality of cemented lenses, and the third lens group G3 contains a plurality of negative cemented lenses.

This liquid immersion type microscope objective lens is classified as a microscope objective lens contactable at its front end with a culture liquid (medium) when in use, and utilized for the patch clamp wherein its operation distance is ensured sufficiently.

The first lens 11, disposed closest to the object, of the liquid immersion type microscope objective lens is the lens brought into contact with the liquid such as the culture liquid when in use.

Therefore, a material of the first lens 11 preferably involves the use of a glass such as a quartz glass and a comparatively low refractive index crown-series glass exhibiting a high durability against the water and containing no component toxic or harmful to a biological sample.

This type of glass is, however, small both in the refractive index and in power for bending a beam of light, with the result that the first lens 11 as a single lens element makes the beam divergent too much. It is therefore difficult to increase a magnification by reducing a focal length of the whole objective lens system and to correct aberrations of the whole system.

Such being the case, the second lens 12 exhibiting a high refractive index and high refractive power is cemented to the first lens 11. Namely, the first lens 11 and the second lens 12 form a cemented meniscus lens.

A height of beam is restrained well by the cemented meniscus lens. Further, the aberration can be decreased by optimizing a configuration of the cemented meniscus lens.

Moreover, the liquid immersion type microscope objective lens preferably takes such a structure that a portion closer to an image than the second lens 12 is incorporated into a barrel (not shown), and the first lens 11 is exposed to the exterior.

With this structure, even if the liquid immersion type microscope objective lens is increased in its numerical aperture, the front end can be kept acute to some degree for the high numerical aperture, and an operability (of an electrode) can be also kept when performing the patch clamp.

Further, the liquid immersion type microscope objective lens in this embodiment can obtain a higher magnification and a higher numerical aperture by adopting a structure that will hereinafter be explained.

At first, it is required for increasing the magnification that the high refractive power be given to the first lens group G1. Generally, it is considered that a radius of curvature is decreased in order to increase the refractive power.

According to this embodiment, however, the operation distance must be ensured, and hence it is inevitable that there increases the height of beam when incident upon the first lens 11. If the height of beam is thus large, the aberration is easy to occur, and it is therefore required that the decrease in the radius of curvature be avoided to the greatest possible degree.

Hence, this embodiment takes a method, other than decreasing the radius of curvature, for giving the high refractive power to the first lens group G1.

Namely, to begin with, two pieces of single lenses 13, 14 are disposed closer to an image than the cemented meniscus lens (11, 12) in the first lens group G1.

Action of these single lenses 13, 14 enables the largely divergent beam to be substantially collimated even in a way that keeps the radius of curvature comparatively large.

This effect is enhanced if the refractive index of the object-sided single lens 13 of these single lenses 13, 14 is set large.

Next, the second lens group G2 performs a function of converting the beam substantially collimated by the first lens group G1 into convergent beam.

Herein, a large proportion of the first lens group G1 described above is constructed of the positive lens elements with no negative lens element contained, whereby almost no aberration is corrected inside.

Therefore, the second lens group G2 performs, together with the third lens group G3 which will hereinafter be explained, a function of correcting the aberration occurred in the first lens group G1.

Categories of the aberrations corrected by the second lens group G2 are a high-order aberration component, a chromatic spherical aberration and a lateral chromatic aberration.

Further, especially a longitudinal chromatic aberration among the aberrations is not absolutely corrected in the first lens group G1, and therefore a balance is taken by over-correcting it in the second lens group G2.

The third lens group G3 has negative refractive power for collimating the convergent beam. The aberrations of the positive lenses, which occur in the first lens group G1, are eventually corrected by the aberrations of the negative lens units of the third lens group G3.

Note that in the third lens group G3, though not illustrated in FIG. 1, the height of beam is decreased, and concave surfaces each exhibiting comparatively strong power are disposed in a face-to-face relationship, thereby reducing a curvature-of-field aberration with a decrease in Petzval sum.

Respective conditional formulae satisfied by the liquid immersion type microscope objective lens in this embodiment, will hereinafter be explained.

At first, for increasing the magnification in a way that keeps the sufficient operation distance, a distance d0 on the optical axis to a first lens surface S1 from the surface of the object needs to be larger than a focal length f of the whole objective lens system.

The following formula (1) is a conditional formula necessary for increasing the numerical aperture.

$$4 < |r_1/f| < 7 \tag{1}$$

where $r_1$ is a radius of curvature of the first lens surface S1 of the first lens group G1.

Supposing that what is considered is only ensuring the operation distance, and if a value of $|r_1/f|$ is large, a sag becomes small, and this is preferable. In the case of simultaneously scheming to increase the numerical aperture, however, a high-order spherical aberration and a high-order coma stay residual if the value of $|r_1/f|$ exceeds an upper limit value, the aberrations can not be corrected in the subsequent lens groups (G2, G3). Whereas if the value of $|r_1/f|$ is under a lower limit value, the operation distance decreases, and besides, if largely under the lower limit value, it follows that the beam diverges. Therefore, the refractive power of the second lens group G2 must be enhanced to a considerable degree, and a proper power geometry is hard to be maintained.

Further, the following formulae (2) and/or (3) are conditional formulae for obtaining a more preferable performance.

$$n_3 > 1.65 \tag{2}$$

$$0.6 > |r_2/r_1| < 0.9 \tag{3}$$

where $n_3$ is a refractive index of the single lens 13, and $r_2$ is a radius of curvature of the cemented surface (S2) between the first lens 11 and the second lens 12.

The conditional formula (2) specifies the refractive index of the single lens 13 contained in the first lens group G1.

As described above, the high refractive power must be given to the first lens group G1 of the liquid immersion type microscope objective lens in this embodiment. In this case, supposing that a glass with this value $n_3$ under the lower limit value is used for the single lens 13, there arises a necessity of decreasing the radius of curvature in order to obtain the refractive power. As a result, the residual aberrations increase. Moreover, if largely under this lower limit value, an edge thickness of the lens can not be ensured, resulting in an increase in load of a correction quantity in the second lens group G2.

The conditional formula (3) specifies a ratio of the radius of curvature between the first lens surface S1 and the cemented surface (S2) in the case where the first lens 11 and the second lens 12 of the first lens group G1 are formed as the cemented meniscus lens.

If the value of $|r_2/r_1|$ is under the lower limit value, the radius of curvature of the cemented surface becomes too small, and the lens is hard to be worked. Whereas if above the upper limit value, an angle of incidence of the aperture beam entering the cemented surface becomes too large, and it is difficult to correct the high-order spherical aberration.

EXAMPLES

First and second examples of the present invention will hereinafter be explained with reference to the drawings.

First Example

Figure 2:
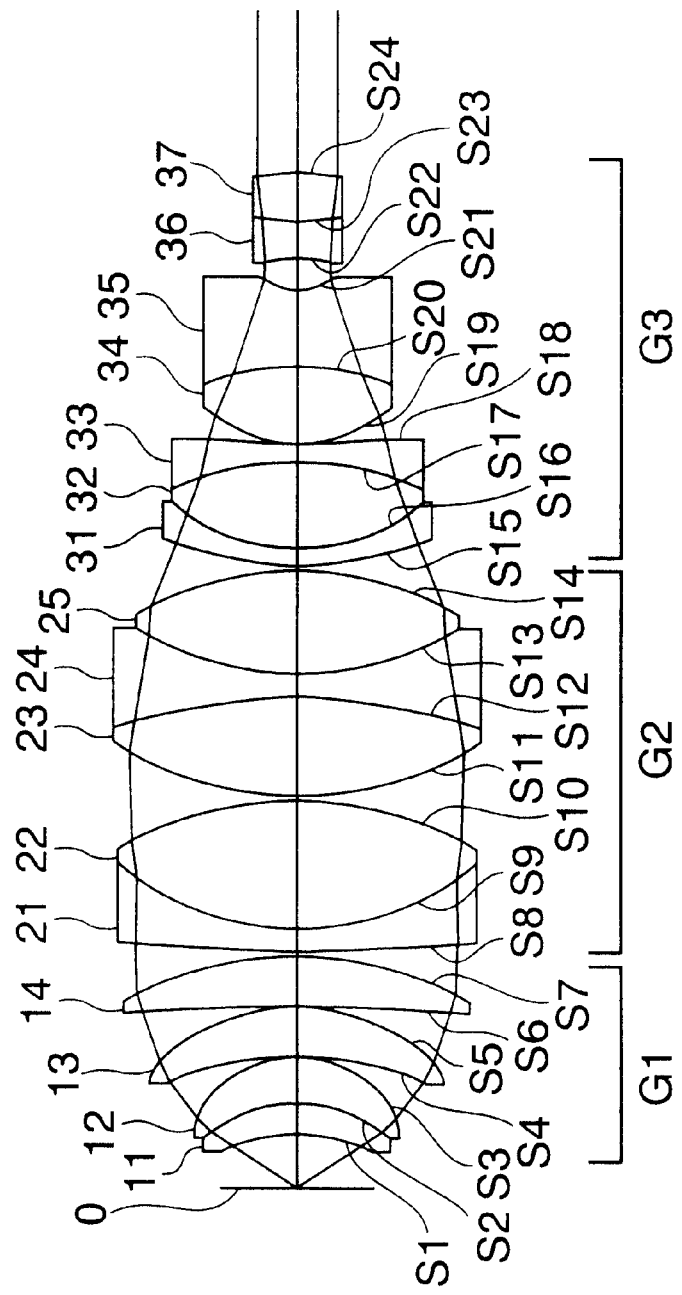
FIG. 2 is a view showing a layout of lens elements of the liquid immersion type microscope objective lens in a first example of the present invention.

FIG. 2 is a view showing a layout of lens elements of the liquid immersion type microscope objective lens in the first example.

The liquid immersion type microscope objective lens includes, in sequence from the object side, the first lens group G1 having the cemented meniscus lens (11, 12) with concave surfaces toward the object and the positive refractive power, the second lens group G2 having the positive refractive power and the third lens group G3 having the negative refractive power.

Further, the second lens group G2 contains a plurality of cemented lenses (21, 22 and 23 through 25), and the third lens group G3 contains three sets negative cemented lenses (31 through 33, 34 and 35, and 36 and 37).

Table 1 given below shows lens data of the liquid immersion type microscope objective lens.

TABLE 1

$f = 2$ mm, N.A. $= 1.1$, $\beta = -100$, $d0 = 3.40$

| Surface S | Radius of Curvature r | Surface Separation d | Refractive Index nd | Abbe's Number vd | |
|---|---|---|---|---|---|
| 1  | −10.4252 | 1.9  | 1.45850 | 67.85 | |
| 2  | −9.1397  | 3.0  | 1.80400 | 46.58 | |
| 3  | −6.6453  | 0.1  |         |       | |
| 4  | −19.2326 | 3.0  | 1.77250 | 49.62 | G1 |
| 5  | −11.8184 | 0.15 |         |       | |
| 6  | −84.4848 | 3.0  | 1.65844 | 50.88 | |
| 7  | −20.0708 | 0.2  |         |       | |
| 8  | 97.8673  | 1.3  | 1.74951 | 35.33 | |
| 9  | 15.1702  | 8.2  | 1.43385 | 95.25 | |
| 10 | −21.4677 | 0.2  |         |       | |
| 11 | 19.2973  | 6.3  | 1.49782 | 82.52 | |
| 12 | −30.4862 | 1.5  | 1.65412 | 39.68 | G2 |
| 13 | 18.1178  | 6.6  | 1.43385 | 95.25 | |
| 14 | −18.6432 | 0.2  |         |       | |
| 15 | 22.7108  | 1.2  | 1.52682 | 51.35 | |
| 16 | 12.2046  | 5.3  | 1.43385 | 95.25 | |
| 17 | −18.8533 | 1.0  | 1.74951 | 35.33 | |
| 18 | 43.1842  | 0.2  |         |       | |
| 19 | 8.0986   | 4.8  | 1.49782 | 82.52 | |
| 20 | −12.9281 | 4.8  | 1.73350 | 51.09 | G3 |
| 21 | 3.8673   | 2.0  |         |       | |
| 22 | −5.1367  | 2.0  | 1.69680 | 55.53 | |
| 23 | 11.4757  | 3.0  | 1.92286 | 18.90 | |
| 24 | −18.7612 |      |         |       | |

(Condition Corresponding Values)
$d0 = 3.4$, $f = 2.0$
$|r_1/f| = 5.21$
$n_3 = 1.7725$
$|r_2/r_1| = 0.877$ In Table 1, S represents a lens surface number, r is a radius of curvature of the lens surface, d is a surface separation, and nd and vd are respectively a refractive index and Abbe's number of each of the glass materials used for the respective lenses with respect to the d-line. As for other symbols, f designates a focal length of the whole objective lens system, N.A. is a numerical aperture, $\beta$ is a magnification, and d0 is a distance on the optical axis to the first lens surface S1 from the object surface.

Further, an immersion liquid (immersed in a gap between the object surface and the first lens surface S1) used for the liquid immersion type microscope objective lens is herein water, and its immersion liquid refractive index and Abbe's number are nd=1.33306, and vd=55.8, respectively.

FIGS. 3A through 3D are graphs showing various aberrations of the liquid immersion type microscope objective lens in the first example.

Figure 3:
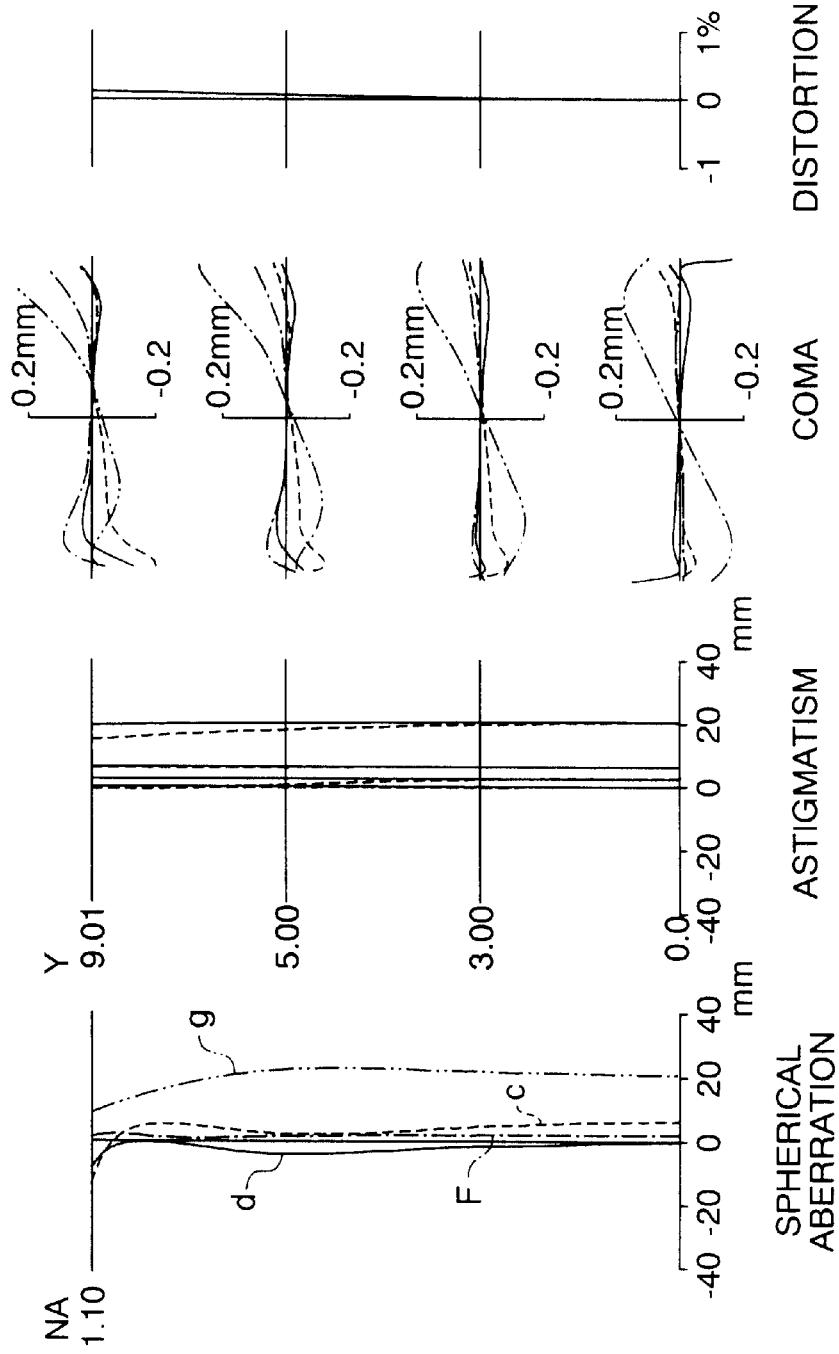
FIGS. 3A through 3D are graphs showing various aberrations of the liquid immersion type microscope objective lens in the first example.

FIG. 3A shows a spherical aberration. FIG. 3B shows an astigmatism. FIG. 3C shows a coma. FIG. 3D shows a distortion.

Referring again to FIG. 3A, "d" represents the d-line (587.6 nm), C is the C-line (656.3 nm), F is the F-line (486.1 nm), and g is the g-line (435.8 nm).

Further, the solid line in FIG. 3B indicates a sagittal image surface, and the broken line represents a meridional image surface.

Note that the liquid immersion type microscope objective lens in the first example is categorized as an infinity system correction type, and hence the image is not formed by the objective lens alone. Therefore, the liquid immersion type microscope objective lens is used in a state where an image forming lens is actually disposed posterior (closer to the image) to the objective lens.

The data shown in Table 1 and FIGS. 3A through 3D are the data in the case where the liquid immersion type microscope objective lens in the first example is used in combination with the image forming lens (see FIG. 6 and Table 3) that will be explained later on.

Second Example

Figure 4:
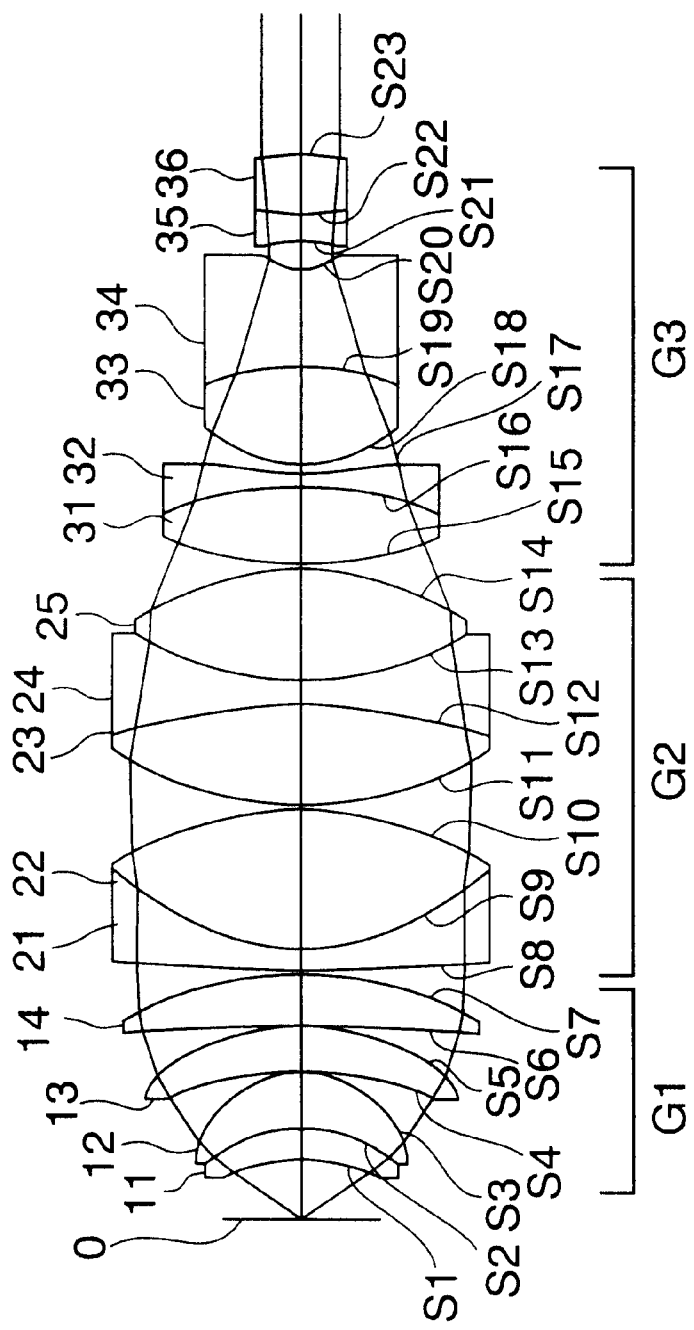
FIG. 4 is a view showing a layout of lens elements of the liquid immersion type microscope objective lens in a second example of the present invention.

FIG. 4 is a view showing a configuration of the liquid immersion type microscope objective lens in a second example.

The liquid immersion type microscope objective lens includes, in sequence from the object side, the first lens group G1 having a cemented meniscus lens (11, 12) with concave surfaces toward the object and a positive refractive power, the second lens group G2 having a positive refractive power and the third lens group G3 having a negative refractive power.

Further, the second lens group G2 contains a plurality of cemented lenses (21, 22 and 23 through 25), and the third lens group G3 contains three sets of negative cemented lenses (31 and 32, 33 and 34, and 35 and 36).

Table 2 given below shows lens data of this liquid immersion type microscope objective lens.

TABLE 2

$f = 2$ mm, N.A. $= 1.1$, $\beta = -100$, $d0 = 3.4$

| Surface S | Radius of Curvature r | Surface Separation d | Refractive Index nd | Abbe's Number vd | |
|---|---|---|---|---|---|
| 1  | −10.1966 | 1.9  | 1.45850 | 67.85 | |
| 2  | −8.9760  | 3.0  | 1.80400 | 46.58 | |
| 3  | −6.6089  | 0.1  |         |       | |
| 4  | −19.7288 | 3.0  | 1.77250 | 49.62 | |
| 5  | −11.9167 | 0.15 |         |       | G1 |
| 6  | −87.8656 | 3.0  | 1.65844 | 50.88 | |
| 7  | −20.1858 | 0.2  |         |       | |
| 8  | 148.5844 | 1.3  | 1.74951 | 35.33 | |
| 9  | 15.1737  | 8.2  | 1.43385 | 95.25 | |
| 10 | −19.8327 | 0.2  |         |       | |
| 11 | 19.9217  | 6.0  | 1.49782 | 82.52 | |
| 12 | −42.2723 | 1.5  | 1.67163 | 38.80 | G2 |
| 13 | 19.5542  | 6.7  | 1.43385 | 95.25 | |
| 14 | −18.2247 | 0.2  |         |       | |
| 15 | 22.1080  | 4.7  | 1.43385 | 95.25 | |
| 16 | −19.2062 | 1.0  | 1.74951 | 35.33 | |
| 17 | 36.3253  | 0.3  |         |       | |
| 18 | 9.5697   | 6.0  | 1.49782 | 82.52 | |
| 19 | −14.1746 | 5.5  | 1.73350 | 51.09 | |
| 20 | 4.3157   | 2.0  |         |       | |
| 21 | −4.7853  | 1.5  | 1.69680 | 55.53 | |
| 22 | 11.2465  | 3.5  | 1.92286 | 18.90 | G3 |
| 23 | −18.2664 |      |         |       | |

(Condition Corresponding Values)
$d0 = 3.4$, $f = 2.0$
$|r_1/f| = 5.10$
$n_3 = 1.7725$
$|r_2/r_1| = 0.880$ In Table 2, S represents a lens surface number, r is a radius of curvature of the lens surface, d is a surface separation, and nd and vd are respectively a refractive index and Abbe's number of each of the glass materials used for the respective lenses with respect to the d-line. As for other symbols, f designates a focal length of the whole objective lens system, N.A. is a numerical aperture, β is a magnification, and d0 is a distance on the optical axis to the first lens surface S1 from the object surface.

Further, an immersion liquid (immersed in a gap between the object surface and the first lens surface S1) used for the liquid immersion type microscope objective lens is herein water, and its immersion liquid refractive index and Abbe's number are nd=1.33306, and vd=55.8, respectively.

FIGS. 5A through 5D are graphs showing various aberrations of the liquid immersion type microscope objective lens in the second example.

Figure 5:
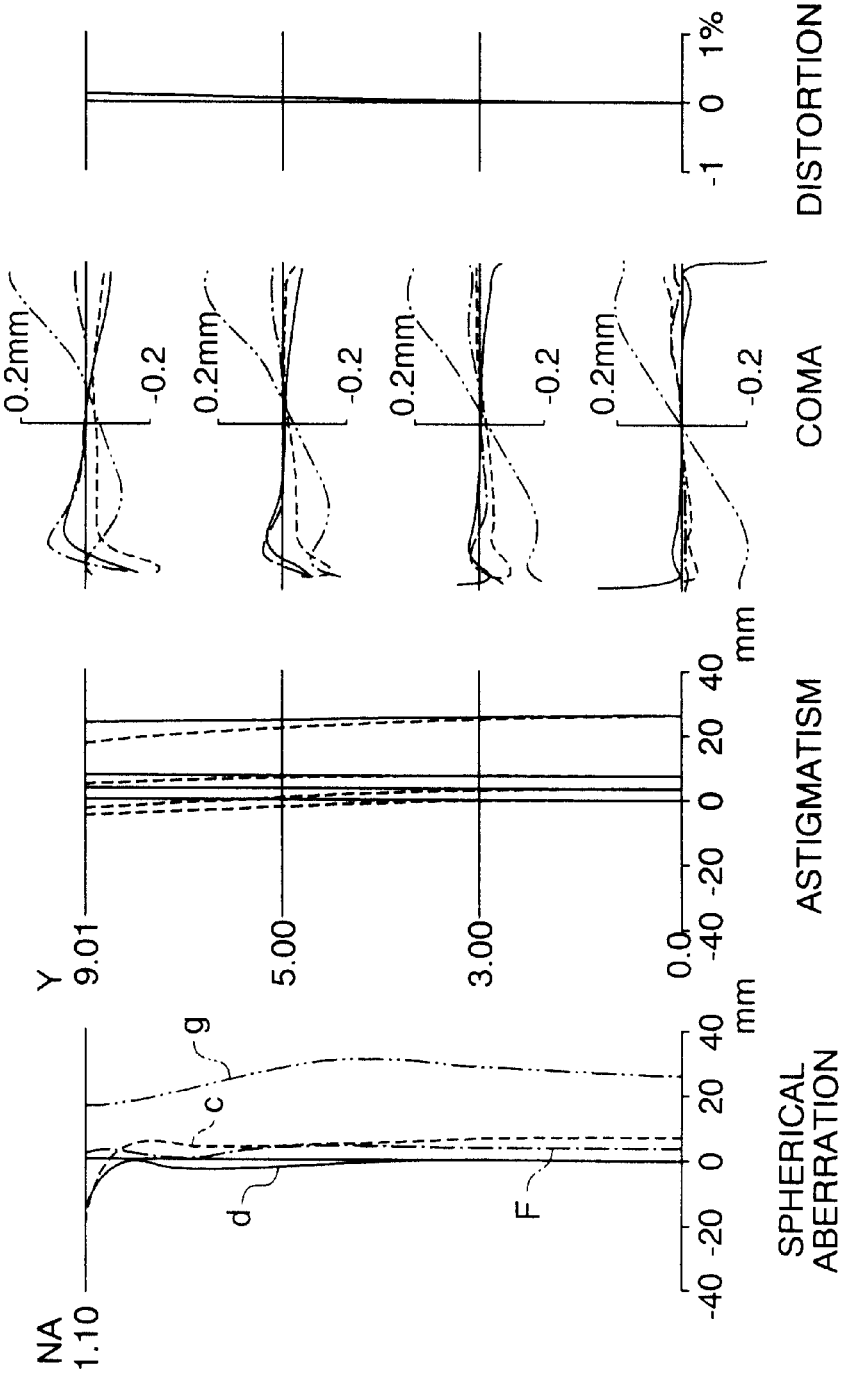
FIGS. 5A through 5D are graphs showing various aberrations of the liquid immersion type microscope objective lens in the second example.

FIG. 5A shows a spherical aberration. FIG. 5B shows an astigmatism. FIG. 5C shows a coma. FIG. 5D shows a distortion.

Referring again to FIG. 5A, "d" represents the d-line (587.6 nm), C is the C-line (656.3 nm), F is the F-line (486.1 nm), and g is the g-line (435.8 nm).

Further, the solid line in FIG. 5B indicates a sagittal image surface, and the broken line represents a meridional image surface.

Note that the liquid immersion type microscope objective lens in the first example is categorized as an infinity system correction type, and hence the image is not formed by the objective lens alone. Therefore, the liquid immersion type microscope objective lens is used in a state where an image forming lens is actually disposed posterior (closer to the image) to the objective lens.

The data shown in Table 2 and FIGS. 5A through 5D are the data in the case where the liquid immersion type microscope objective lens in the first example is used in combination with the image forming lens (see FIG. 6 and Table 3) that will be explained later on.

<Supplementation>

Figure 6:
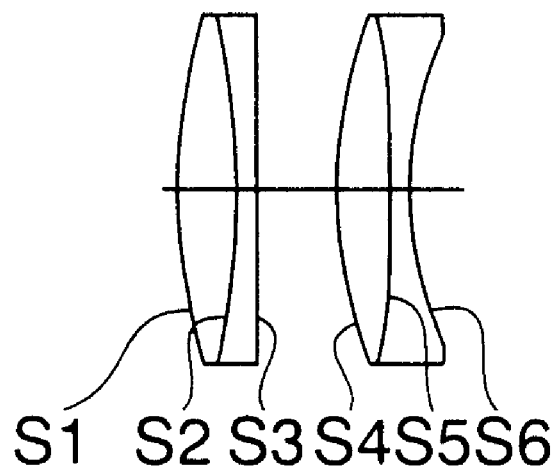
FIG. 6 is a view showing a configuration of one example of an image forming lens used in combination with the liquid immersion type microscope objective lens.

FIG. 6 is a view showing the image forming lens (one example) used in combination with the liquid immersion type objective lens.

Table 3 given below shows lens data of this image forming lens.

TABLE 3 f = 200 mm

| Surface S | Radius of Curvature r | Surface Separation d | Refractive Index nd | Abbe's Number vd |
|---|---|---|---|---|
| 1 | 75.043 | 5.1 | 1.62801 | 57.03 |
| 2 | −75.043 | 2.0 | 1.74950 | 35.19 |
| 3 | 1600.580 | 7.5 | | |
| 4 | 50.256 | 5.1 | 1.66755 | 41.96 |
| 5 | −84.541 | 1.8 | 1.61266 | 44.41 |
| 6 | 36.911 | | | |

In Table 3, S represents a lens surface number, r is a radius of curvature of the lens surface, d is a surface separation, and nd and vd are respectively a refractive index and Abbe's number of each of the glass materials used for the respective lenses with respect to the d-line. As for other symbols, f designates a focal length of the whole objective lens system.

As discussed above, according to the present invention, the liquid immersion type microscope objective lens capable of increasing the magnification and the numerical aperture in a way that keeps the sufficient operation distance, is actualized.

What is claimed is:

1. A liquid immersion type microscope objective lens, in sequence from an object side, comprising:

a first lens group containing a meniscus lens with the concave surfaces toward an object and having positive refractive power;

a second lens group having the positive refractive power; and a third lens group having negative refractive power, wherein a distance d0 from an object surface to a first lens surface of said first lens group is larger than a focal length f of a whole objective lens system, and a radius of curvature $r_1$ of the first lens surface in relation to the focal length f satisfies the following formula (1):

$$4<|r_1/f|<7 \tag{1}$$

2. A liquid immersion type microscope objective lens according to claim 1, wherein said first lens group is constructed of cemented meniscus lens and two or more single lenses.

3. A liquid immersion type microscope objective lens according to claim 2, wherein a refractive index $n_3$ of said single lens, closest to the object, of said single lenses satisfies the following formula (2):

$$n_3>1.65 \tag{2}$$

4. A liquid immersion type microscope objective lens according to claim 2, wherein a radius of curvature $r_2$ of a cemented surface of said meniscus lens and the radius of curvature $r_1$ of the first lens surface satisfy the following formula (3):

$$0.6<|r_2/r_1|<0.9 \tag{3}$$

5. A liquid immersion type microscope objective lens according to claim 3, wherein a radius of curvature $r_2$ of a cemented surface of said meniscus lens and the radius of curvature $r_1$ of the first lens surface satisfy the following formula (3):

$$0.6<|r_2/r_1|<0.9 \tag{3}$$

* * * * *